United States Patent
Sano

(10) Patent No.: US 10,924,634 B2
(45) Date of Patent: Feb. 16, 2021

(54) IMAGE PROCESSING APPARATUS AND IMAGE PROCESSING METHOD

(71) Applicant: CANON KABUSHIKI KAISHA, Tokyo (JP)

(72) Inventor: Shinji Sano, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/826,390

(22) Filed: Nov. 29, 2017

(65) Prior Publication Data

US 2018/0160014 A1 Jun. 7, 2018

(30) Foreign Application Priority Data

Dec. 6, 2016 (JP) .................. 2016-236670

(51) Int. Cl.
*H04N 1/58* (2006.01)
*H04N 1/60* (2006.01)

(52) U.S. Cl.
CPC ............ *H04N 1/58* (2013.01); *H04N 1/6008* (2013.01); *H04N 1/6027* (2013.01); *H04N 2201/0094* (2013.01)

(58) Field of Classification Search
CPC ...... H04N 1/58; H04N 1/6008; H04N 1/6027; H04N 2201/0094
USPC ........ 358/2.1, 1.9, 1.15, 518, 515, 519, 448, 358/462; 382/162, 167
See application file for complete search history.

(56) References Cited

U.S. PATENT DOCUMENTS

| | | | |
|---|---|---|---|
| 6,744,921 B1 | 6/2004 | Uchida et al. | 382/185 |
| 8,284,451 B2 | 10/2012 | Misawa et al. | 358/2.1 |
| 8,379,274 B2 | 2/2013 | Tamura | 358/3.27 |
| 8,467,102 B2 | 6/2013 | Sano et al. | 358/3.13 |
| 8,593,694 B2 | 11/2013 | Tamura | 358/3.26 |
| 9,313,366 B2 | 4/2016 | Oka | H04N 1/58 |
| 2005/0219583 A1* | 10/2005 | Foster | G06K 15/12 358/1.9 |
| 2008/0055654 A1 | 3/2008 | Tamura | 358/3.26 |
| 2009/0214238 A1* | 8/2009 | Tanaka | H04N 1/40037 399/51 |
| 2012/0236366 A1* | 9/2012 | Imai | G06K 15/1852 358/2.1 |
| 2013/0128290 A1 | 5/2013 | Tamura | 358/1.9 |

(Continued)

FOREIGN PATENT DOCUMENTS

| | | |
|---|---|---|
| JP | H03-62177 | 3/1991 |
| JP | H07-203198 | 8/1995 |

(Continued)

OTHER PUBLICATIONS

Office Action dated Sep. 8, 2020 in counterpart Japanese Application No. 2016-236670, together with English translation thereof.

*Primary Examiner* — Quang N Vo
(74) *Attorney, Agent, or Firm* — Venable LLP

(57) ABSTRACT

In the case where both thickening processing and UCR processing are performed for an object, appropriate effects are obtained for both pieces of the processing. An image processing apparatus including an image processing unit configured to perform thickening processing for an object included in an input image and to perform saturation suppression processing for an edge portion of the object in the input image for which the thickening processing has been performed.

11 Claims, 21 Drawing Sheets

(56) References Cited

U.S. PATENT DOCUMENTS

2015/0015918 A1\* 1/2015 Eguchi .................... G06T 5/001
358/3.27
2016/0044208 A1 2/2016 Oka ............................ 358/3.27

FOREIGN PATENT DOCUMENTS

| JP | 2008-061136 | 3/2008 |
| JP | 2009-171426 | 7/2009 |
| JP | 2016-039408 | 3/2016 |

\* cited by examiner

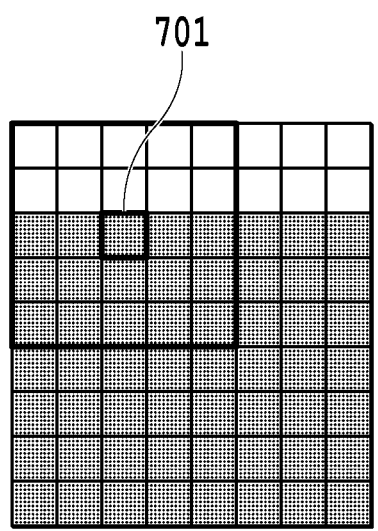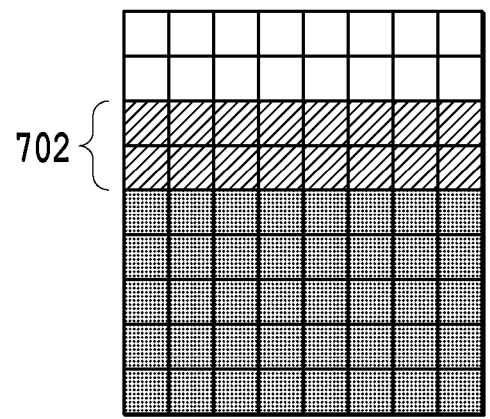
FIG.7A     FIG.7B

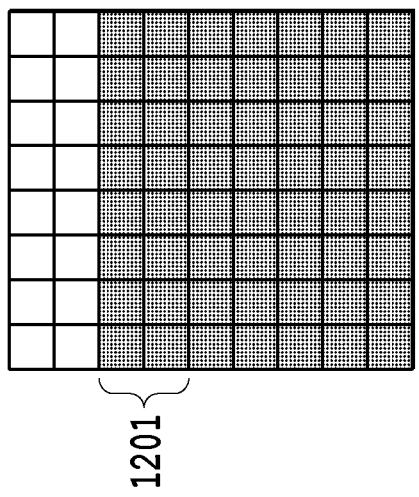
FIG.12C
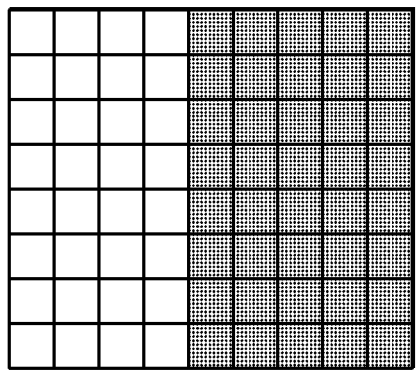
FIG.12B
1201
FIG.12A

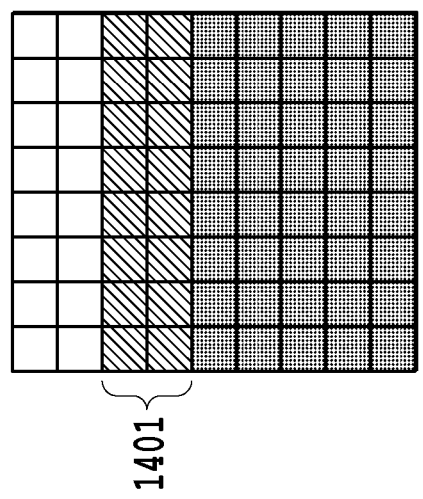
FIG.14C
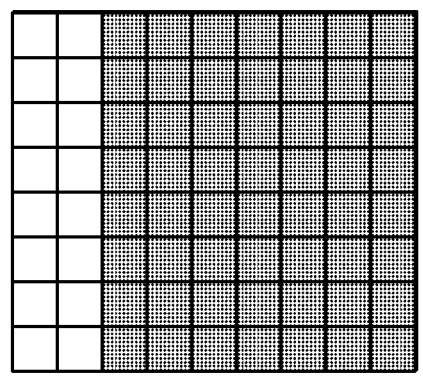
1401
FIG.14B
FIG.14A

|  |  | FLAG VALUE OF THICKENING PROCESSING | |
|---|---|---|---|
|  |  | 0 | 1 |
| FLAG VALUE OF UCR PROCESSING | 0 | USE IMAGE AFTER THICKENING PROCESSING | USE IMAGE AFTER THICKENING PROCESSING |
|  | 1 | USE IMAGE AFTER UCR PROCESSING | USE IMAGE AFTER THICKENING PROCESSING |

FIG.15

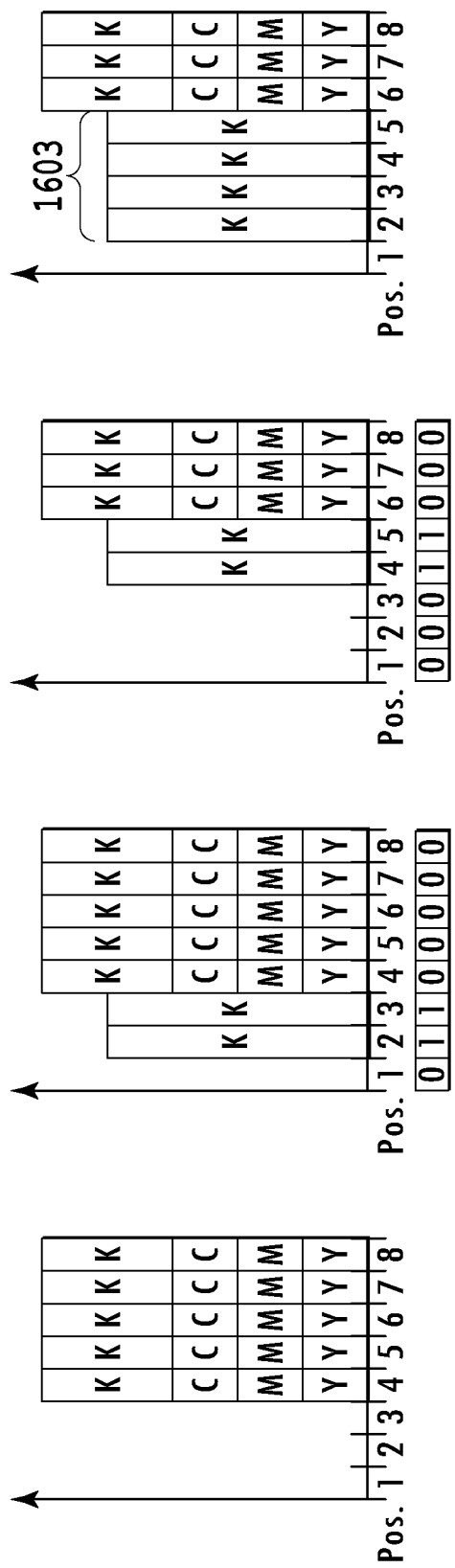

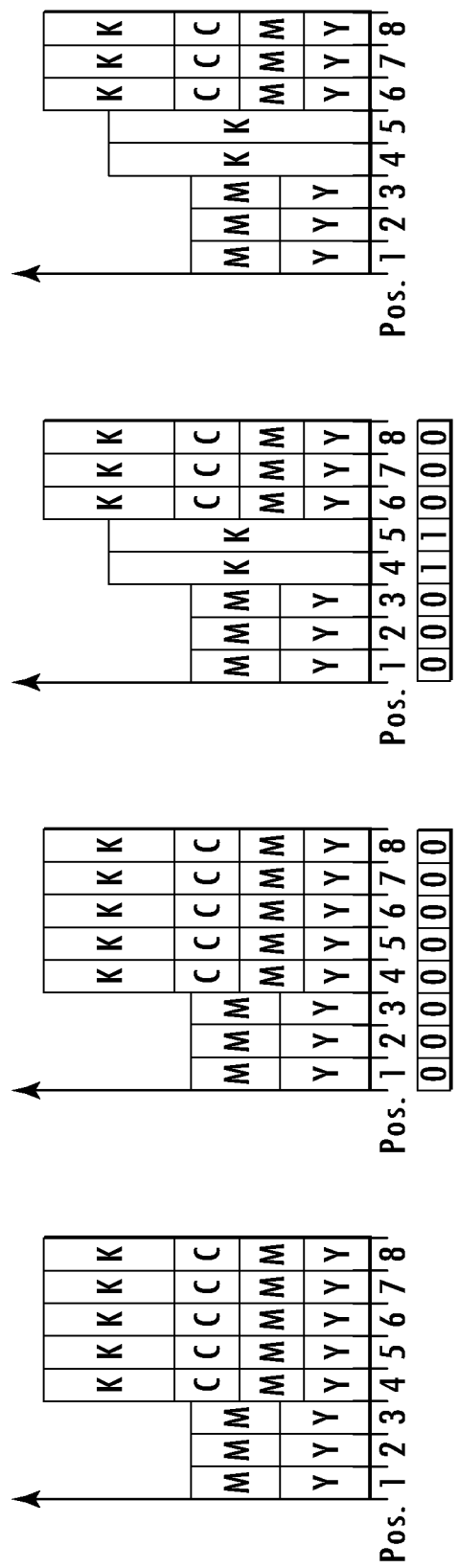

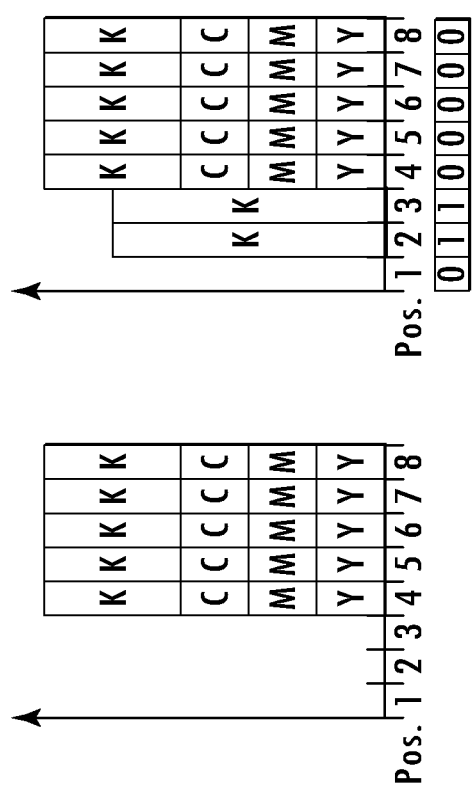
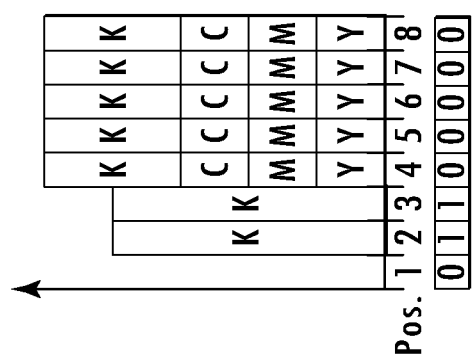
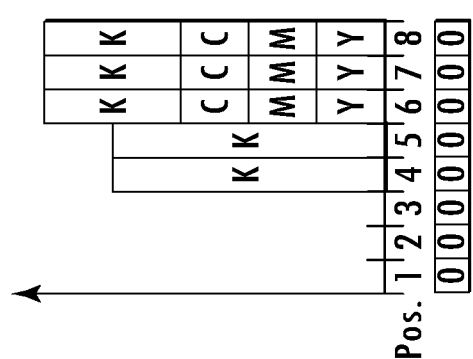
FIG.21A  FIG.21B  FIG.21C  FIG.21D

IMAGE PROCESSING APPARATUS AND IMAGE PROCESSING METHOD

BACKGROUND OF THE INVENTION

Field of the Invention

The present invention relates to image processing to increase the width of an object and to suppress saturation of an edge portion of the object.

Description of the Related Art

In printing processing in an image forming apparatus, such as an SFP (Single Function Printer) and an MFP (Multi Function Printer), various kinds of image processing are performed for input image data that is a printing target. One of them is thickening processing. The thickening processing is processing to replace the pixel value of a pixel in a white area on the periphery with the pixel value of a pixel making up an image object (hereinafter, simply called an object), such as a character and a thin line within an image so that the width of the character or the line increases in the direction of the white area. By this processing, it is made possible to make an object, such as a character and a thin line, within an input image look thicker, or to recover such a problem that a line or the like is output as a line or the like thinner than the original one because of characteristics of an image forming apparatus (see Japanese Patent Laid-Open No. H03-62177(1991)). Further, as another technique, there is edge portion saturation suppression processing. For a pixel making up a black object, there is not only a case where the pixel has the pixel value of pure black (K) (black including K alone) but also a case where the pixel has a combination of pixel values of different color components of cyan, magenta, yellow, and black (CMYK). Processing to replace a pixel at an edge portion with a pixel represented by pure black (K) without marring the appearance of the black object such as this is the edge portion saturation suppression processing and also called under color removal (UCR) processing. By this UCR processing, it is made possible to prevent a color shift from occurring at the edge portion of the black object even in the case where a plurality of color planes corresponding to color materials shifts from one another (see Japanese Patent Laid-Open No. H07-203198 (1995)).

Both the thickening processing and the UCR processing described above are processing that is performed for the periphery of an edge portion of an object. In the case where both pieces of the processing are performed for the same image, respectively, there is a possibility that sufficient results are not obtained because both pieces of the processing interfere with each other. FIG. 1A to FIG. 1D are diagrams explaining the way both pieces of the processing interfere with each other. FIG. 1A is a schematic diagram one-dimensionally showing an edge portion (8-pixel width) of an object and the horizontal axis represents the pixel position and the vertical direction represents the pixel value (amount of color material at the time of output) of CMYK colors. Here, in FIG. 1A, eight pixels are shown and it is assumed that the position of each pixel is indicated by Pos. 1 to Pos. 8 from left. In FIG. 1A, Pos. 1 to Pos. 3 correspond to a white area in which the pixel value of each color is "0", that is, a white area with no color materials. Then, Pos. 4 to Pos. 8 correspond to a non-white area in which the pixel value of each color is positive, that is, a non-white area that is colored. Here, the color of each pixel at Pos. 4 to Pos. 8 is black, which is a mixed color including four color components of CMYK. FIG. 1B is a diagram showing the results obtained by performing the thickening processing for the edge portion in FIG. 1A. Of the pixels in the white area (Pos. 1 to Pos. 3) in FIG. 1A, to the pixels at Pos. 2 and Pos. 3 located at a distance less than or equal to a predetermined distance from the non-white area (here, 2-pixel width or smaller), the same pixel value as that of the pixels in the non-white area (Pos. 4 to Pos. 8) is added. It is known that the non-white area is extended up to the position a 2-pixel width distant from the original edge position by the thickening processing and accompanying this, the white area is reduced. FIG. 1C is a diagram showing the results obtained by performing the UCR processing for the edge portion in FIG. 1A. It is known that Black monochromatization (processing to turn black, which is a mixed color, into pure black (K)) has been performed for the pixels at Pos. 4 and Pos. 5 of the pixels in the non-white area (Pos. 4 to Pos. 8) in FIG. A, which are in contact with the white area. The figure within the rectangle located at the bottom in FIG. 1B and FIG. 1C is 1-bit flag information indicating execution or non-execution of pixel value replacement in the thickening processing and Black monochromatization in the UCR processing. Then, FIG. 1D is a diagram showing the results of the combination processing, which are obtained by calculating the logical sum of both flag values. It is known that, in the combination processing, the pixel whose flag value is "1" is selected preferentially as the combination results.

Here, from a comparison between FIG. 1A and FIG. 1D, it is known that the effect of the thickening processing is certainly obtained in the combination results. However, pixels for which Black monochromatization has been performed are only the pixels at Pos. 4 and Pos. 5, which make up the original edge portion, and Black monochromatization has not been performed for the pixels at Pos. 2 and Pos. 3, for which the thickening processing has been performed. That is, because the edge end portion has moved from Pos. 4 to Pos. 2 by the thickening processing, the original effect of the UCR processing is not obtained as a result. As described above, in the case where the thickening processing and the UCR processing are performed separately for the input image and the results are simply combined, there is such a problem that a sufficient effect of the UCR processing is not obtained.

SUMMARY OF THE INVENTION

The image processing apparatus according to the present invention is an image processing apparatus including an image processing unit configured to perform thickening processing for an object included in an input image and to perform saturation suppression processing for an edge portion of the object in the input image for which the thickening processing has been performed.

Further features of the present invention will become apparent from the following description of exemplary embodiments with reference to the attached drawings.

BRIEF DESCRIPTION OF THE DRAWINGS

FIG. 7A and FIG. 7B are explanatory diagrams of the UCR processing;

FIG. 9A, FIG. 9B-a, FIG. 9B-b, FIG. 9C-a and FIG. 9C-b are diagrams explaining effects of the first embodiment;

FIG. 12A to FIG. 12C are diagrams showing results of the thickening processing of the second embodiment;

FIG. 14A to FIG. 14C are diagrams showing results of the UCR processing of the second embodiment;

FIG. 15 is an example of a table that is referred to in combination processing;

FIG. 16A to FIG. 16D are diagrams explaining effects of the second embodiment;

FIG. 17A to FIG. 17D are diagrams explaining effects of the second embodiment;

FIG. 21A to FIG. 21D are diagrams explaining effects of the third embodiment.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

[First Embodiment]

Figure 2:
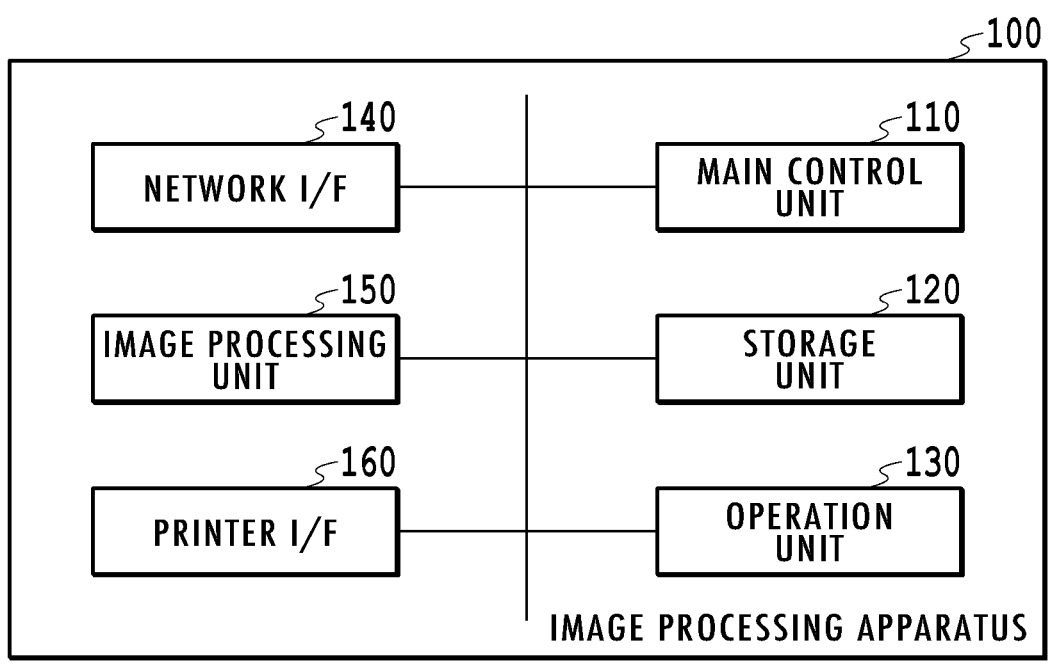
FIG. 2 is a block diagram showing an internal configuration of an image processing apparatus.

FIG. 2 is a block diagram showing an internal configuration of an image processing apparatus according to the present embodiment. An image processing apparatus 100 is a PC and the like connected to an image forming apparatus (printer), not shown schematically, and includes a main control unit 100, a storage unit 120, an operation unit 130, a network I/F 140, an image processing unit 150, and a printer I/F 160. The main control unit 110 is a controller that controls the entire image processing apparatus 100 and includes a CPU, a RAM, and so on. The storage unit 120 is a storage device to store image data, programs to implement various functions of the image processing apparatus 100, and so on, and includes, for example, a DRAM, an HDD, and so on. The operation unit 130 includes, for example, a liquid crystal display having a touch panel function and a keyboard, and is in charge of a user interface function to display information to a user and to receive various input operations from a user. The network I/F 140 is an interface to transmit and receive image data to and from a storage, not shown schematically, in which, for example, image data is stored. The image processing unit 150 includes, for example, an image processing processor and performs predetermined image processing for image data. The printer I/F 160 is an interface to output image data for which image processing has been completed to a printer, not shown schematically. In the present embodiment, the image processing apparatus is explained as an apparatus independent of a printer, but it may also be possible to incorporate an image processing apparatus to be described below as one function of a printer. The image data, which is the target of image processing, may be image data that does not premise printing.

Figure 3:
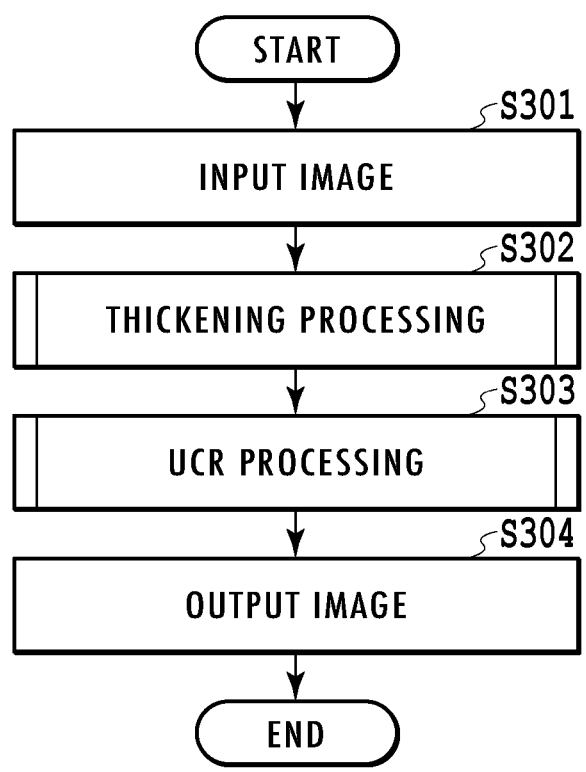
FIG. 3 is a flowchart showing a flow of processing in an image processing apparatus according to a first embodiment.

Following the above, a rough flow is explained, in which the image processing unit 150 performs thickening processing and edge portion saturation suppression processing (UCR processing) for image data that is input to the image processing apparatus 100 and outputs the image data to the printer. FIG. 3 is a flowchart showing a flow of processing in the image processing apparatus 100 according to the present embodiment.

At step 301, by a user operation via the operation unit 130, under the control of the main control unit 100, image data, which is a printing processing target, is input via the network I/F 140. The input image data is saved in the storage unit 120. The input image data is bitmap data having four color components of CMYK (cyan, magenta, yellow, black) per pixel. The pixel value (density value) of one color component of one pixel is represented by, for example, eight bits and one pixel has a pixel value represented by thirty-two bits for the four color components together. This image data is obtained by rasterizing PDL (Page Description Language) data. More specifically, this image data is obtained by converting (rasterizing) PDL data into bitmap data having three color components of RGB (red, green, blue) per pixel and performing color conversion for each pixel from RGB representation into CMYK representation.

Figure 4:
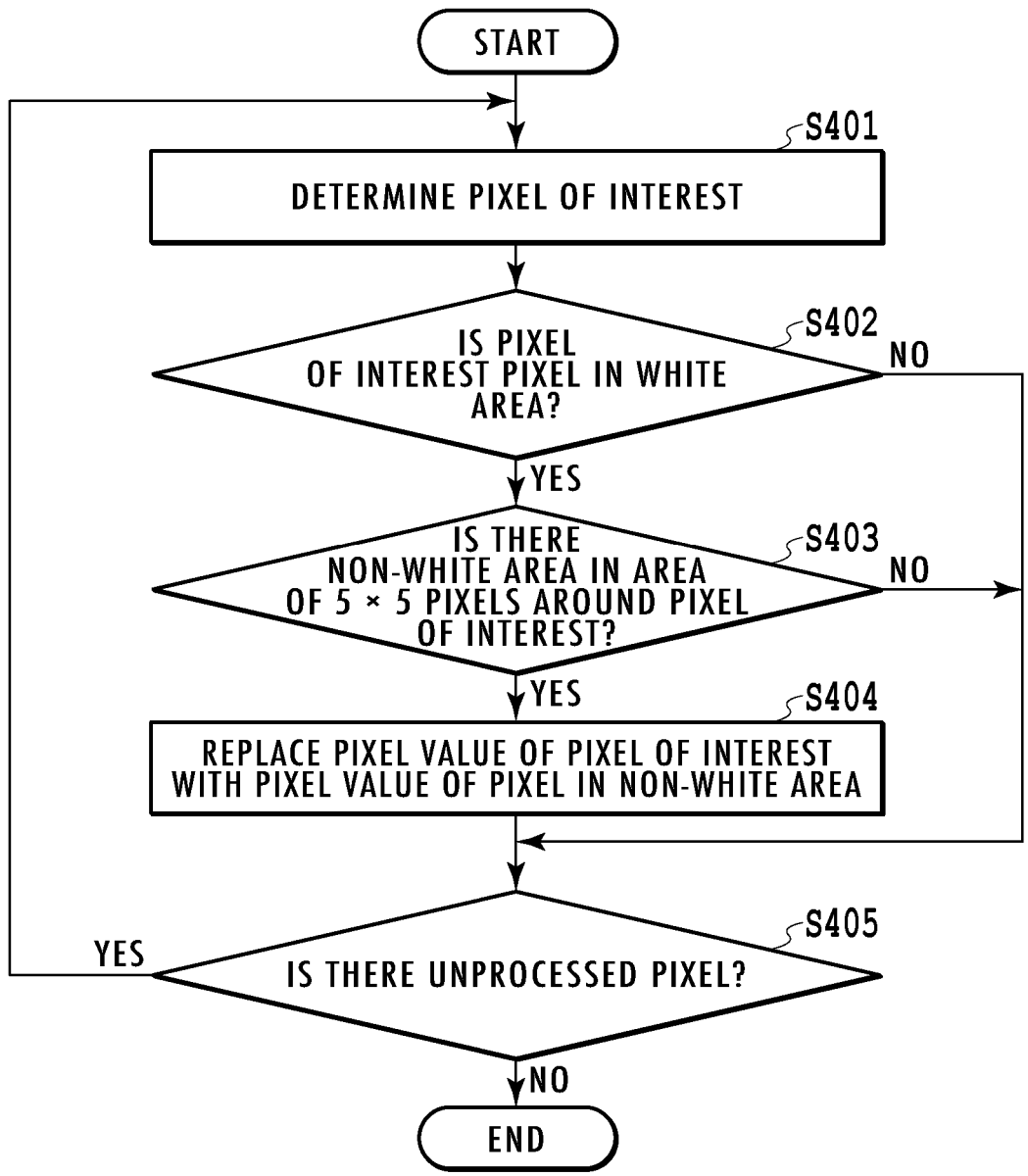
FIG. 4 is a flowchart showing details of thickening processing according to the first embodiment.
Figure 5A:
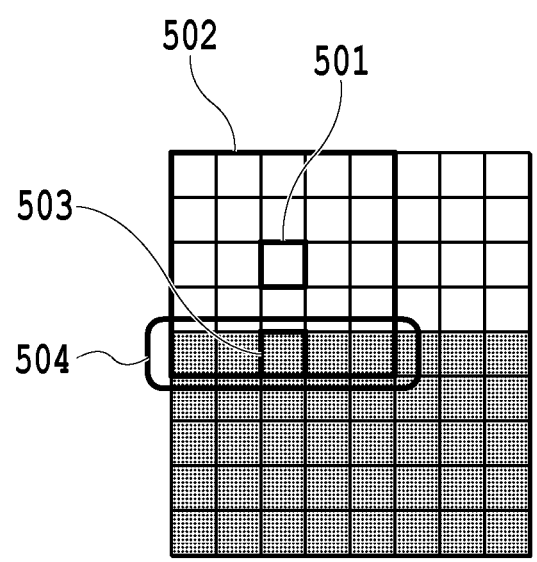
FIG. 5A and FIG. 5B are explanatory diagrams of the thickening processing.
Figure 5B:
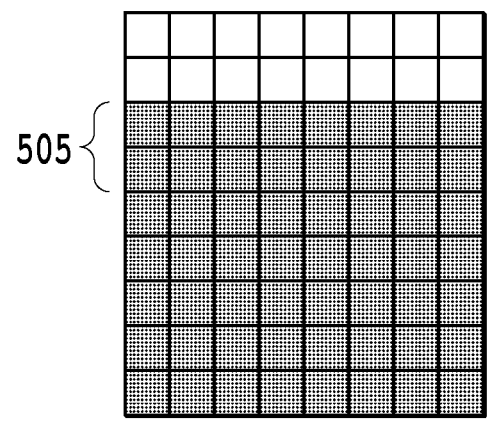

At step 302, under the control of the main control unit 110, the image processing unit 150 performs the thickening processing for an object, such as a character object and a line object, included in the input image data, which is saved in the storage unit 120. FIG. 4 is a flowchart showing details of the thickening processing according to the present embodiment. FIG. 5A and FIG. 5B are explanatory diagrams of the thickening processing. In the following, with reference to the flow in FIG. 4 and the explanatory diagrams in FIG. 5A and FIG. 5B, the case is explained where the width is increased by an amount corresponding to two pixels.

At step 401, a pixel on which attention is focused (pixel of interest) within an input image is determined. For example, in the order from the pixel in the top-left corner of the input image, the pixel is determined as a pixel of interest and the pixel of interest is updated sequentially. FIG. 5A shows part of the input image before the thickening processing, the portion in the vicinity of an edge in an object, such as a character and a line. Here, it is assumed that a pixel shown by a thick-line frame 501 in a white area is determined as a pixel of interest.

At step 402, whether the determined pixel of interest is a pixel in the white area (whether or not the pixel value of the pixel of interest is a pixel value representing white) is determined. At this time, in the case where the pixel value is smaller than a predetermined threshold value even though the pixel value does not represent white in the strict sense, it is determined that the pixel of interest is a pixel in the white area by regarding the pixel value as being equivalent to white. In the case where the results of the determination indicate that the pixel value of the pixel of interest is smaller than the threshold value, the pixel of interest is the pixel in the white area, which has a possibility that the thickening processing is applied, and the processing advances to step 403. On the other hand, in the case where the pixel value of the pixel of interest is larger than or equal to the threshold value, the pixel of interest is the colored pixel (=non-white area) and to which the thickening processing is not applied, and the processing advances to step 405. The pixel 501 is the pixel within the white area, and therefore, the processing advances to step 403.

At step 403, whether there is a non-white area within a predetermined range (here, within an area 502 of 5×5 pixels) whose center is the pixel of interest is determined. The area size depends on a width to which the width is increased. Here, in order to increase the width by an amount of two pixels, the area of 5×5 pixels is selected. In the case where the results of the determination indicate that there is not a non-white area, the thickening processing is not applied and the processing advances to step 405. On the other hand, in the case where there is a non-white area, the processing advances to step 404 and then the thickening processing is applied. In the case where the pixel 501 is the pixel of interest, there is a non-white area within the area 502 of 5×5 pixels, and therefore, the processing advances to step 404.

At step 404, the pixel value of the pixel of interest is replaced with the pixel value of the pixel in the non-white area. In the case of the example in FIG. 5A, the pixel value of the pixel of interest 501 is replaced with the pixel value of a pixel 503 closest to the pixel of interest 501 of the pixels in the non-white area as a new pixel value of the pixel of interest 501. In this pixel value replacement, it may also be possible to perform replacement by selecting one of the pixels in the non-white area as described above, or to replace the pixel value of the pixel of interest with an average value of pixel values of a plurality of pixels in the non-white area, for example, with an average value of pixel values of a plurality of pixels included in a thick-line frame 504.

At step 405, whether the processing has been completed for all the pixels within the input image is determined. In the case where there is an unprocessed pixel, the processing returns to step 401 and the next pixel is determined to be the pixel of interest and the processing is continued. On the other hand, in the case where all the pixels have been processed, the present processing is terminated. FIG. 5B shows the results of performing the thickening processing for all the pixels of the partial image shown in FIG. 5A. By a comparison with FIG. 5A, it is known that an area 505 includes no white pixels and the non-white area is extended by a width corresponding to two pixels. The image data for which the thickening processing has been performed is saved in the storage unit 120. The above is the contents of the thickening processing of the present embodiment. Explanation is returned to the flow in FIG. 3.

Figure 6:
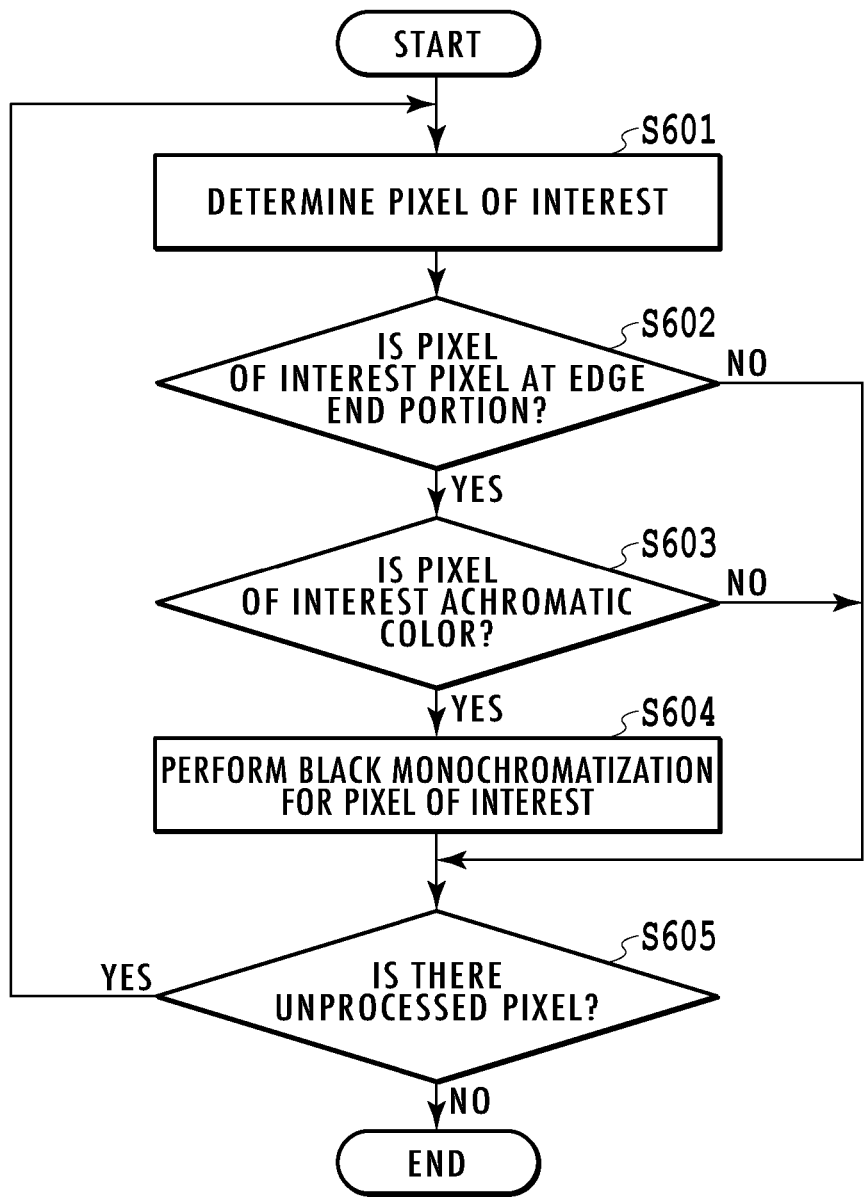
FIG. 6 is a flowchart showing details of UCR processing according to the first embodiment.

At step 303, under the control of the main control unit 110, the image processing unit 150 performs the UCR processing for the image data saved in the storage unit 120 (image data for which the thickening processing has been performed at step 302). FIG. 6 is a flowchart showing details of the UCR processing according to the present embodiment. FIG. 7A and FIG. 7B are explanatory diagrams of the UCR processing. In the following, with reference to the flow in FIG. 6 and the explanatory diagrams in FIG. 7A and FIG. 7B, the case is explained where Black monochromatization is performed for the pixel at an edge end portion.

At step 601, a pixel on which attention is focused (pixel of interest) within the image for which the thickening processing has been performed is determined. As in the flow in FIG. 4, for example, in the order from the pixel in the top-left corner of the image, the pixel is determined as a pixel of interest and the pixel of interest is updated sequentially. FIG. 7A shows the portion in the vicinity of an edge of a character or a line in the image after the thickening processing, which is the target of the UCR processing. Here, it is assumed that a pixel 701 indicated by a thick-line frame within a non-white area is determined as a pixel of interest.

Figure 8A:
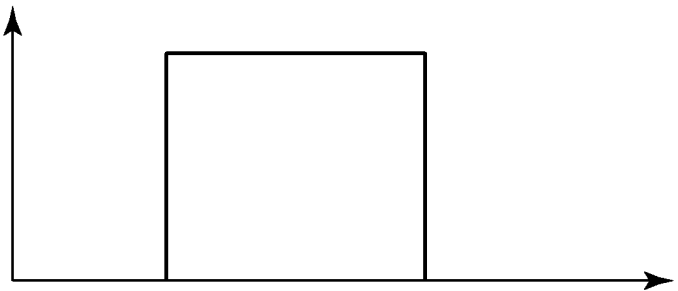
FIG. 8A to FIG. 8C are diagrams explaining edge end portion extraction by second differentiation.
Figure 8B:
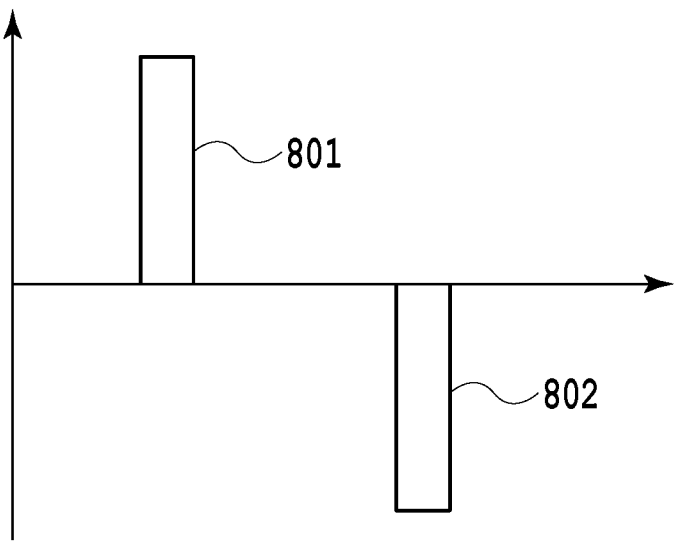
Figure 8C:
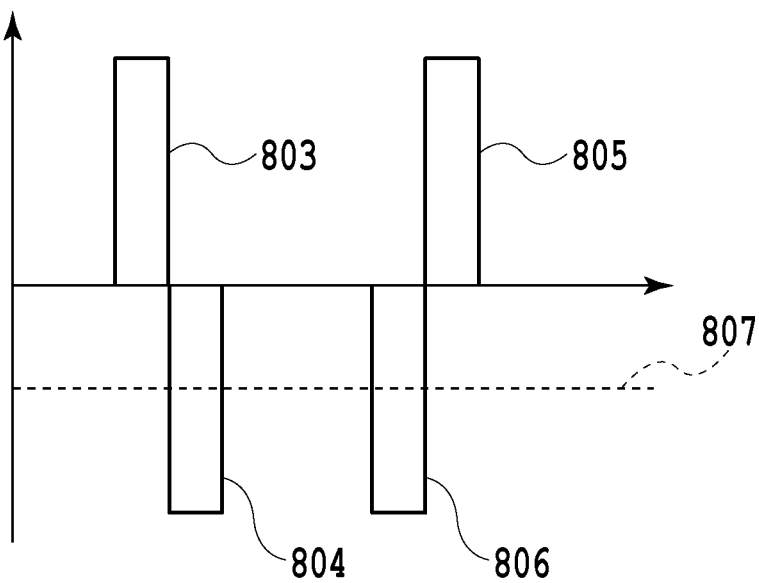

At step 602, whether the determined pixel of interest is a pixel at the edge end portion is determined. For the determination of whether a portion is an edge end portion, for example, edge extraction using a differential filter is used. FIG. 8A to FIG. 8C are diagrams explaining edge end portion extraction by the second differentiation. FIG. 8A corresponds to a section in the line width direction of a character or a line and the vertical axis represents the signal value and the horizontal axis represents the pixel position. FIG. 8B shows the results of performing the first differentiation for the image signal in FIG. 8A and FIG. 8C shows the results of performing the second differentiation, respectively. As shown in FIG. 8B, in the case where the first differentiation is performed for the image signal, a signal 801 and a signal 802, which each correspond to an edge, are obtained. In the case where the second differentiation is performed further, a signal 803 and a signal 805, which each correspond to an outer edge, and a signal 804 and a signal 806, which each correspond to an inner edge, are obtained. Then, by a threshold value 807, which has a negative value, the edge end portion that is a target of Black monochromatization is determined. An actual signal has the shape of a mountain in place of a regular rectangular wave as in FIGS. 8A to 8C, and therefore, by appropriately changing the threshold value 807, it is possible to control the width of the inner edge to be detected, that is, the width of the pixel for which Black monochromatization is performed. In the case where the results of the determination indicate that the pixel of interest is a pixel at the edge end portion, the pixel of interest is a pixel that may be a target of Black monochromatization, and the processing advances to step 603. On the other hand, in the case where the pixel of interest is not a pixel at the edge end portion, the pixel of interest is a pixel that is not a target of Black monochromatization, and the processing advances to step 605. The pixel 701 is a pixel at the edge end portion, and therefore, the processing advances to step 603.

At step 603, whether the pixel of interest is an achromatic color is determined. Here, an achromatic color means black or gray and does not include white. It may also be possible to determine whether the pixel of interest is an achromatic color by determining whether C≈M≈Y holds based on the pixel values (CMYK values) of the pixel of interest, or for example, to save a flag indicating the results of the achromatic color determination performed in advance in association with the coordinates of each pixel and to read the flag. Here, C≈M≈Y means that each of three differences, that is, the difference between the pixel value of the C component and the pixel value of the M component, the difference between the pixel value of the C component and the pixel value of the Y component, and the difference between the pixel value of the M component and the pixel value of the Y component, is included within a predetermined threshold value. In the case where the results of the determination indicate that the pixel of interest is an achromatic color, the processing advances to step 604 and then Black monochromatization is performed. On the other hand, in the case where the pixel of interest is a chromatic color, the Black monochromatization is not performed and the processing advances to step 605. The pixel 701 is an achromatic color pixel, and therefore, the processing advances to step 604.

At step 604, for the pixel of interest, the pixel value of mixed black (black including C, M, Y, and K) is changed into the pixel value of pure black. It may also be possible to perform Black monochromatization by deleting the pixel values of CMY to leave only the pixel value of K, or to calculate the pixel value of pure black from the total amount of CMYK. FIG. 7B shows the results of performing the UCR processing for all the pixels of the image after the processing shown in FIG. 7A. In FIG. 7B, an area 702 having a width corresponding two pixels indicated by oblique lines indicates an area for which Black monochromatization has been performed.

At step 605, whether the processing has been completed for all the pixels within the image after the thickening processing, which is the processing target, is determined. In the case where there is an unprocessed pixel, the processing returns to step 601 and the next pixel is determined to be the pixel of interest and the processing is continued. On the other hand, in the case where all the pixels have been processed, the present processing is terminated. The above is the contents of the UCR processing of the present embodiment. The image data for which the UCR processing has been performed as described above is saved in the storage unit 120. Explanation is returned to the flow in FIG. 3.

At step 304, under the control of the main control unit 110, the image data for which the UCR processing has been performed is transmitted to the printer via the printer I/F 160. The above is the contents of the processing in the image processing apparatus 100 according to the present embodiment.

Figure 1:
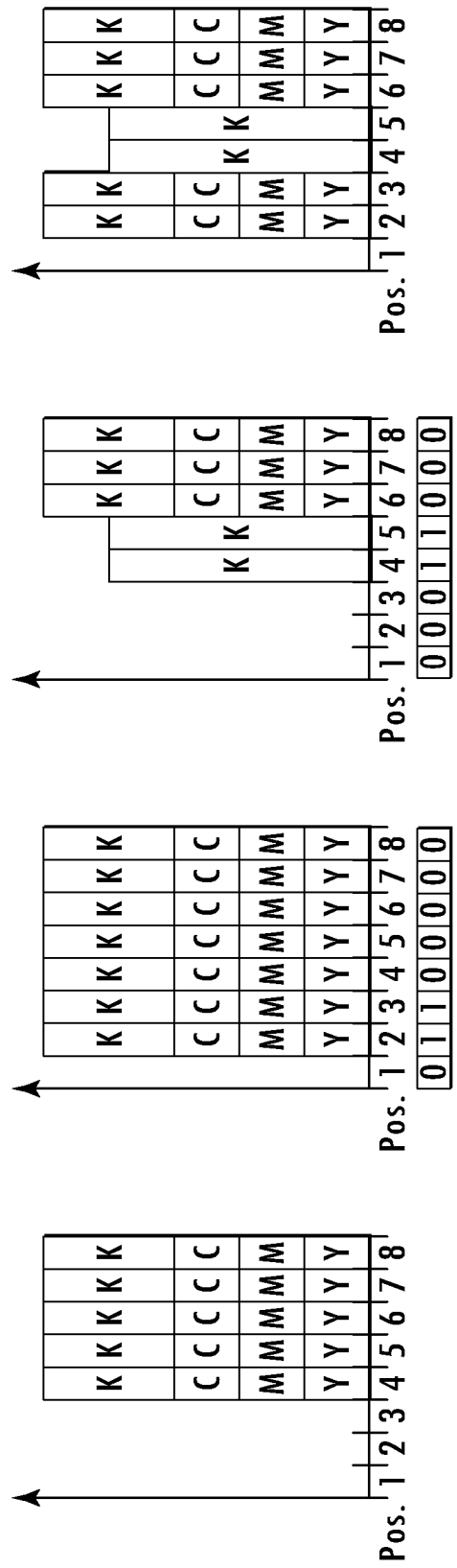
FIG. 1A to FIG. 1D are diagrams explaining the way thickening processing and UCR processing interfere with each other.
Figures 9A, 9B, 9C:
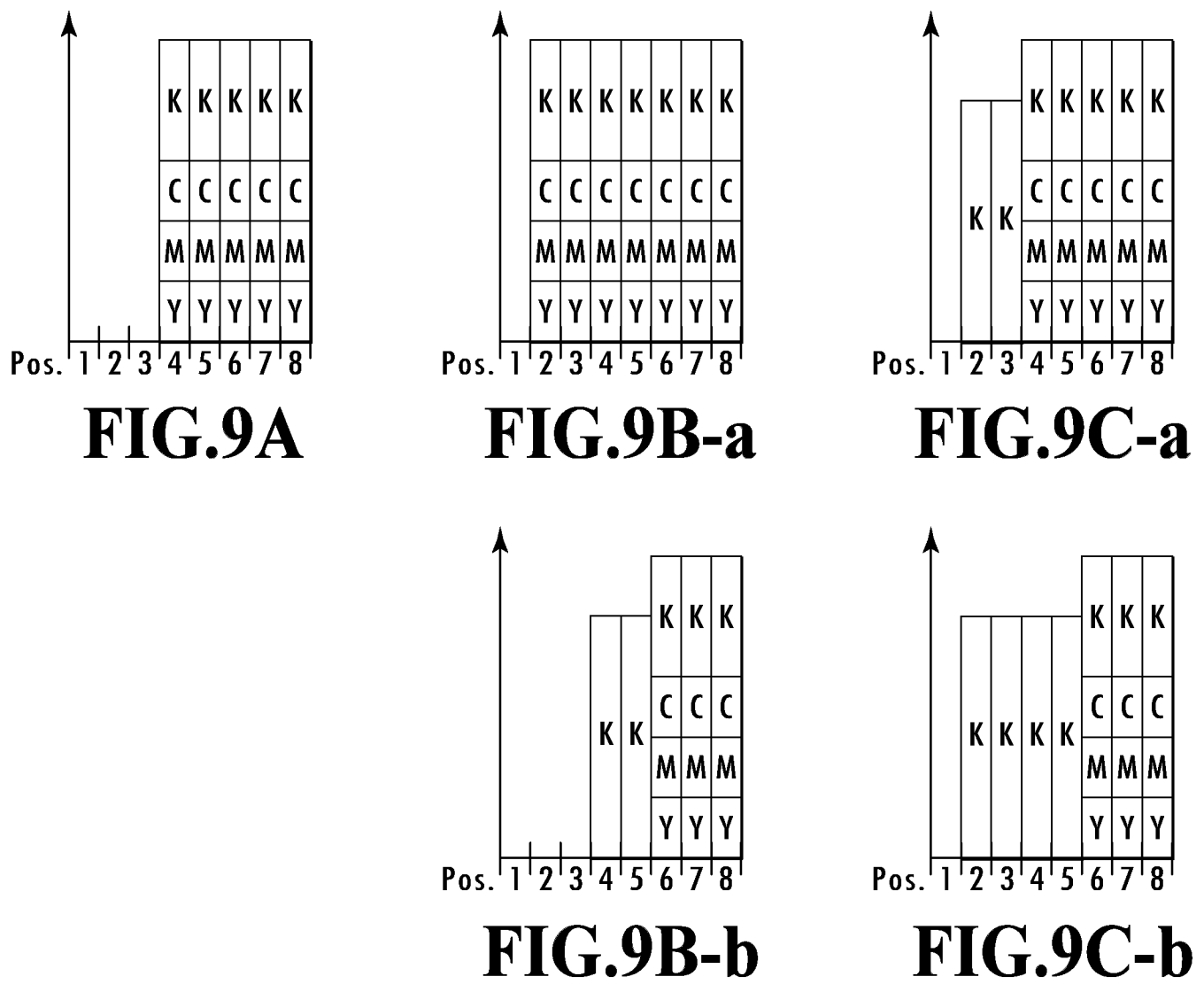

FIG. 9A, FIG. 9B-a, FIG. 9B-b, FIG. 9C-a and FIG. 9C-b are diagram explaining effects of the present embodiment, corresponding to FIG. 1A to FIG. 1D described previously. FIG. 9A is the same schematic diagram as that in FIG. 1A, schematically showing the edge portion of a character or a line in the input image. FIG. 9B-a is a diagram showing the results obtained by performing the thickening processing (step 302 of the flow in FIG. 3) for the edge portion in FIG. 9A, the same as FIG. 1B. FIG. 9C-a is a diagram showing the results obtained by performing the UCR processing (step 303 of the flow in FIG. 3) for the image after the thickening processing shown in FIG. 9B-a. It is known that the pixels at the edge end portions (Pos. 2 and Pos. 3) for which the thickening processing has been performed have changed from mixed black into pure black by the subsequent UCR processing. As above, in the case of the present embodiment, it is known that the effects of both the thickening processing and the UCR processing are obtained appropriately.

FIG. 9B-b and FIG. 9C-b are diagrams in the case where the UCR processing is performed first and then the thickening processing is performed. FIG. 9B-b shows the image after the UCR processing and FIG. 9C-b shows the results obtained by performing the thickening processing for the image after the UCR processing. It is known that the images obtained finally are different by exchanging the order of the processing in a serial configuration. Then, in the case where the UCR processing is performed first, the width of the pixels for which Black monochromatization is performed becomes a width corresponding to four pixels (Pos. 2 to Pos. 5) and a state is brought about where the effect of the UCR processing is more excessive than the supposed effect. The reason is that Black monochromatization has already been performed for the pixels that are referred to at the time of the thickening processing. Countermeasures against such a problem that the effect of the UCR processing becomes excessive will be explained in a third embodiment.

As above, according to the present embodiment, by performing the UCR processing after performing the thickening processing for an input image, it is made possible to obtain appropriate output results without causing both pieces of the processing to interfere with each other.

[Second Embodiment]

In the first embodiment, the configuration in which the thickening processing and the UCR processing are performed serially is explained. However, in the case where an attempt is made to implement the serial configuration such as this by so-called line processing, a line memory is necessary for each of the thickening processing and the UCR processing, and therefore, the circuit scale becomes large. Consequently, an aspect is explained as a second embodiment in which the same effects as those of the first embodiment are implemented while reducing the number of necessary line memories by designing a configuration in which the thickening processing and the UCR processing are performed in parallel. Explanation of the contents in common to those of the first embodiment, such as the basic configuration of the image processing apparatus, is omitted or simplified and in the following, different points are explained mainly.

Figure 10:
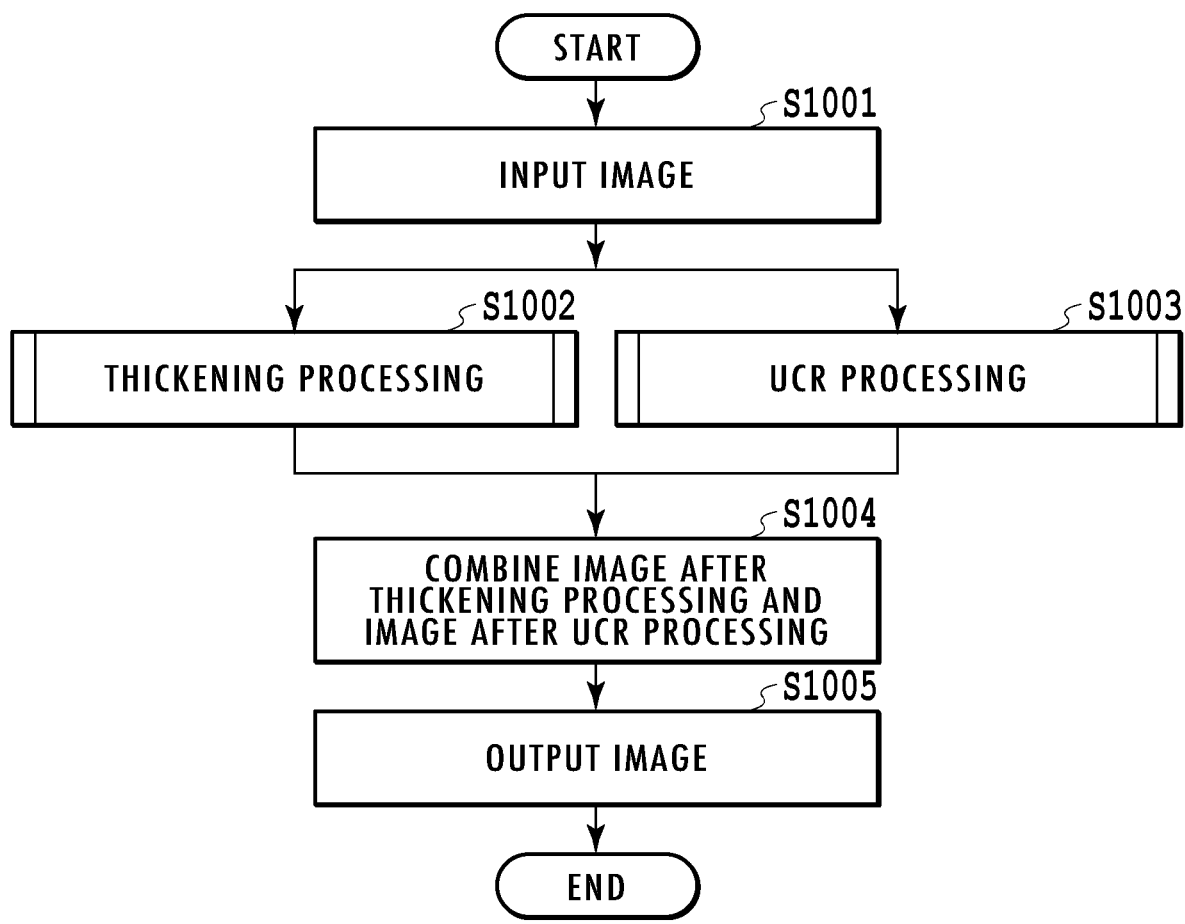
FIG. 10 is a flowchart showing a flow of processing in an image processing apparatus 100 according to a second embodiment.

FIG. 10 is a flowchart showing a flow of processing in the image processing apparatus 100 according to the present embodiment. At step 1001, by the user operation via the operation unit 130, under the control of the main control unit 110, printing processing-target image data is input via the network I/F 140. The input image data is saved in the storage unit 120.

Figure 11:
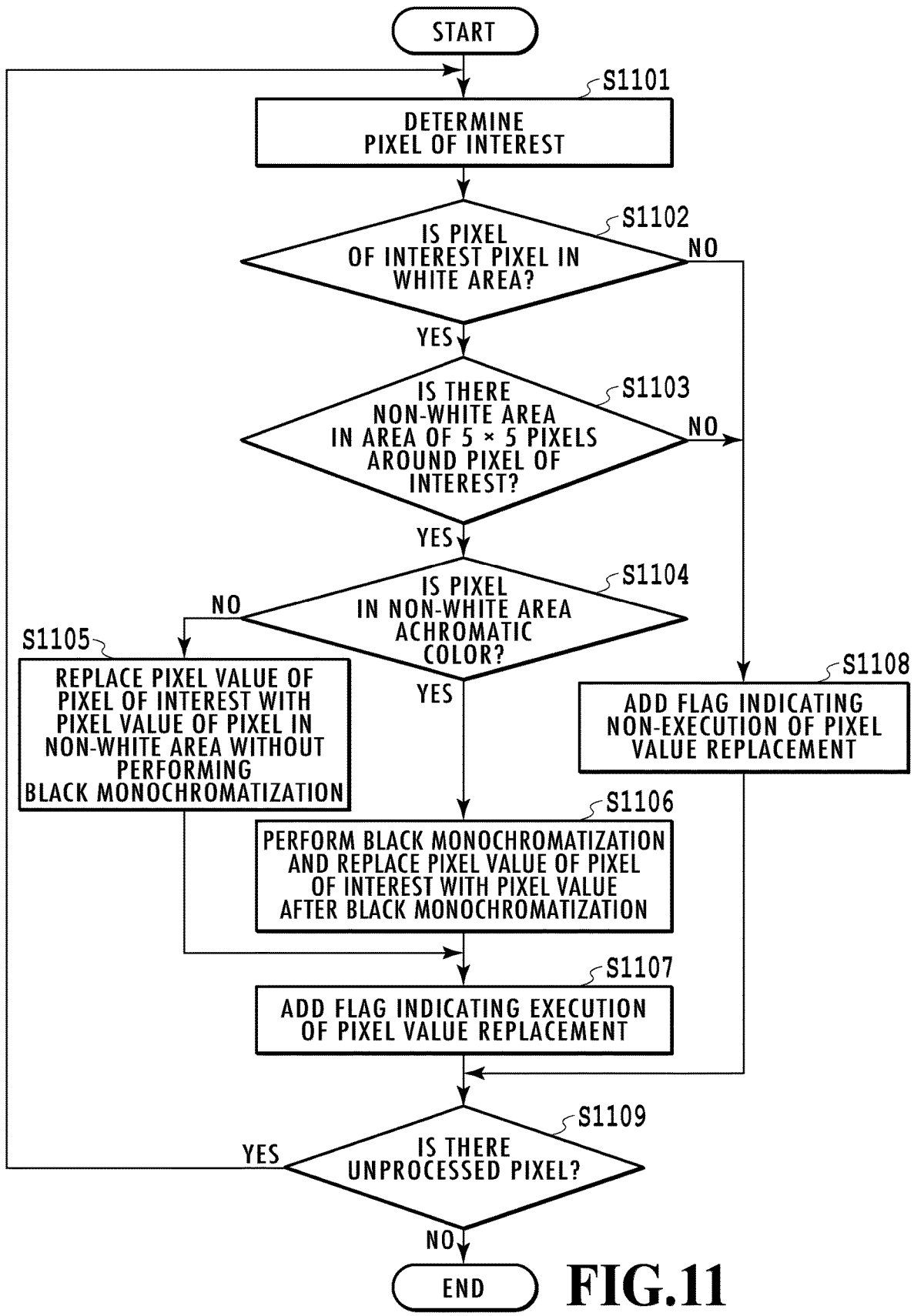
FIG. 11 is a flowchart showing details of thickening processing according to the second embodiment.

At step 1002, under the control of the main control unit 110, the image processing unit 150 performs the thickening processing for the input image data saved in the storage unit 120. FIG. 11 is a flowchart showing details of the thickening processing according to the present embodiment.

At step 1101, as at step 401 of the first embodiment, a pixel of interest within the input image is determined. At step 1102 that follows, as at step 402 of the first embodiment, whether the determined pixel of interest is a pixel in the white area is determined. In the case where the results of the determination indicate that the pixel of interest is a pixel in the white area, the processing advances to step 1103. On the other hand, in the case where the pixel of interest is not a pixel in the white area (in the case where the pixel of interest is a pixel in the non-white area), the processing advances to step 1108. Then, at step 1103, as at step 403 of the first embodiment, whether there is a non-white area within a predetermined range whose center is the pixel of interest is determined. In the case where the results of the determination indicate that there is not a non-white area, the processing advances to step 1108. On the other hand, in the case where there is a non-white area, the processing advances to step 1104.

At step 1104, whether the pixel in the non-white area is an achromatic color is determined. In the case where the results of the determination indicate that the pixel in the non-white area is an achromatic color, the processing advances to step 1106. On the other hand, in the case where the pixel in the non-white area is a chromatic color, the processing advances to step 1105.

At step 1105, as at step 404 of the first embodiment, the pixel value of the pixel of interest is replaced with the pixel value of the pixel in the non-white area. On the other hand, at step 1106, after performing Black monochromatization for the pixel value of the pixel in the non-white area, which the target of replacement, the pixel value of the pixel of interest is replaced with the value after the Black monochromatization.

At step 1107, an on-flag indicating execution of pixel value replacement is generated and added to the pixel of interest. At step 1108, an off-flag indicating non-execution of pixel value replacement is generated and added to the pixel of interest. Each of the flags is a 1-bit signal and at step 1107, a value of "1" indicating on is associated with the coordinates of the pixel of interest and at step 1108, a value of "0" indicating off is associated therewith. After the flag indicating execution or non-execution of pixel value replacement is added, whether the processing has been completed for all the pixels within the input image is determined at step 1109. In the case where there is an unprocessed pixel, the processing returns to step 1101 and the next pixel is determined to be the pixel of interest and the processing is continued. On the other hand, in the case where all the pixels have been processed, the present processing is terminated. FIG. 12A to FIG. 12C are diagrams showing the results of the thickening processing of the present embodiment. FIG. 12A is the same as FIG. 5A and shows part of the input image before the thickening processing, the portion in the vicinity of an edge in an object, such as a character and a line. FIG. 12B is the same as FIG. 5B and shows results of performing the thickening processing for all the pixels of the partial image shown in FIG. 12A. Then, FIG. 12C shows the contents of the flag indicating execution or non-execution of pixel value replacement, which is added to each pixel of the image after the thickening processing in FIG. 12B. As is obvious from FIG. 12C, to the pixels in an area 1201 with a width of two pixels, which has newly become the non-white area, a value of "1" of the on-flag is set and to the other pixels, a value of "0" of the off-flag is set. The image data after the thickening processing and the information on the flag, which are obtained as above, are saved in the storage unit 120. Explanation is returned to the flow in FIG. 10.

Figure 13:
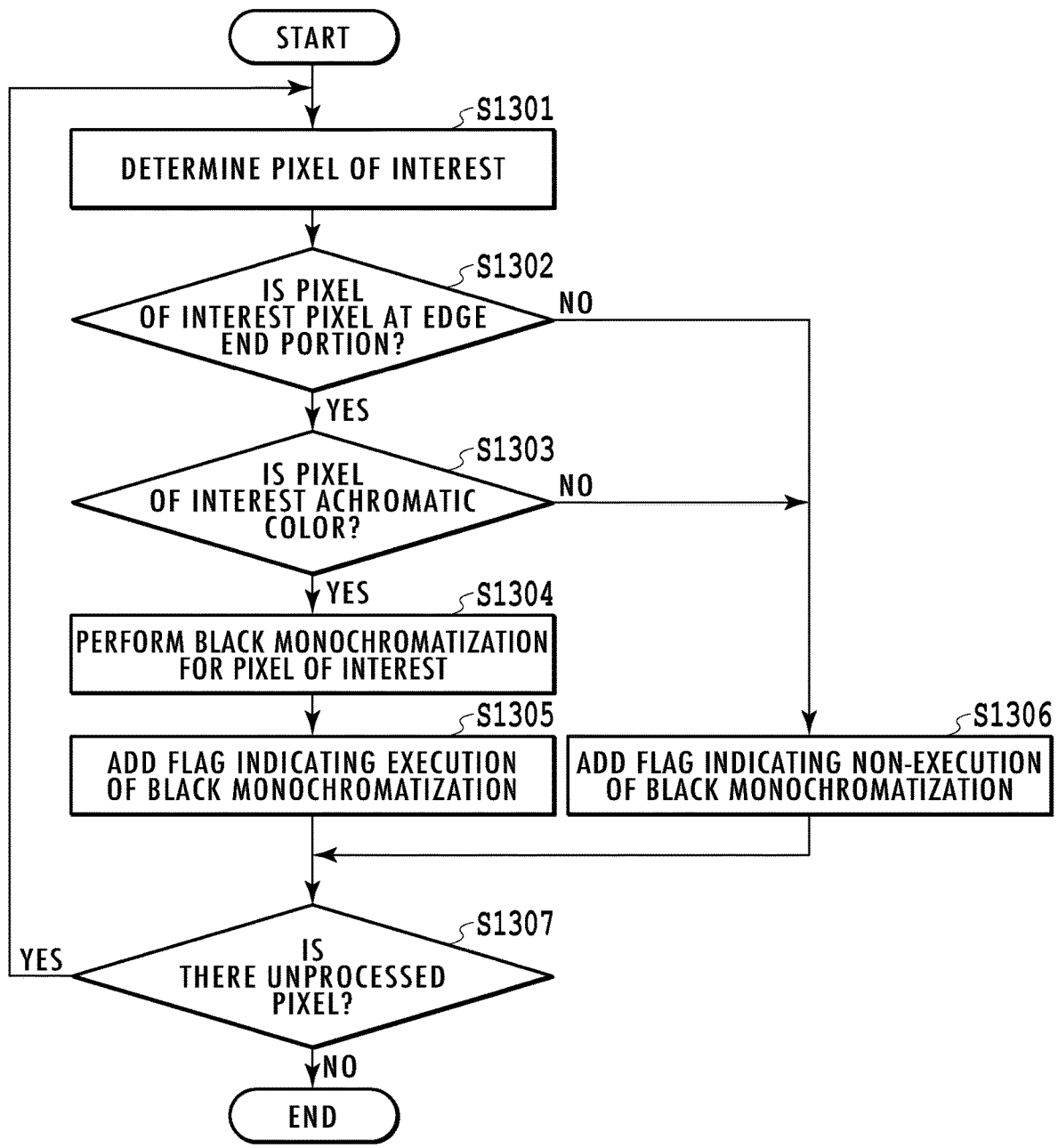
FIG. 13 is a flowchart showing details of UCR processing according to the second embodiment.

At step 1003, under the control of the main control unit 110, the image processing unit 150 performs the UCR processing for the input image data saved in the storage unit 120. FIG. 13 is a flowchart showing details of the UCR processing according to the present embodiment.

At step 1301, as at step 601 of the first embodiment, a pixel of interest within the input image is determined. At step 1302 that follows, as at step 602 of the first embodiment, whether the determined pixel of interest is a pixel at the edge end portion is determined. In the case where the results of the determination indicate that the pixel of interest is a pixel at the edge end portion, the pixel of interest is a pixel that may be a target of Black monochromatization, and the processing advances to step 1303. On the other hand, in the case where the pixel of interest is not a pixel at the edge end portion, the pixel of interest is a pixel that is not a target of Black monochromatization, and the processing advances to step 1306. Then, at step 1303, as at step 603 of the first embodiment, whether the pixel of interest is an achromatic color is determined. In the case where the results of the determination indicate that the pixel of interest is an achromatic color, the processing advances to step 1304 and Black monochromatization is performed for the pixel value of mixed black of the pixel of interest. On the other hand, in the case where the pixel of interest is a chromatic color, the Black monochromatization is not performed and the processing advances to step 1306.

At step 1305, an on-flag indicating execution of Black monochromatization is generated and added to the pixel of interest. Further, at step 1306, an off-flag indicating non-execution of Black monochromatization is generated and added to the pixel of interest. Each of the flags is also a 1-bit signal like the thickening processing flag and at step 1305, a value of "1" indicating on is associated with the coordinates of the pixel of interest and at step 1306, a value of "0" indicating off is associated therewith. After the flag indicating execution or non-execution of Black monochromatization is added, at step 1307, whether the processing has been completed for all the pixels within the input image is determined. In the case where there is an unprocessed pixel, the processing returns to step 1301 and the next pixel is determined to be the pixel of interest and the processing is continued. On the other hand, in the case where all the pixels have been processed, the present processing is terminated. FIG. 14A to FIG. 14C are diagrams showing the results of the UCR processing of the present embodiment. FIG. 14A shows part of the input image before the UCR processing, the portion in the vicinity of an edge in an object, such as a character and a line. FIG. 14B shows the results of performing the UCR processing for all the pixels of the partial image shown in FIG. 14A. Then, FIG. 14C shows the contents of the flag indicating execution or non-execution of Black monochromatization, which is added to each pixel of the image after the UCR processing in FIG. 14B. As is obvious from FIG. 14C, to the pixels in an area 1401 for which Black monochromatization has been performed, a value of "1" of the on-flag is set and to the other pixels, a value of "0" of the off-flag is set. The image data after the UCR processing and the information on the flag, which are obtained as above, are saved in the storage unit 120. Explanation is returned to the flow in FIG. 10.

At step 1004, under the control of the main control unit 110, the image after the thickening processing and the image after the UCR processing are combined. FIG. is an example of a table that is referred to in the combination processing and by using the table such as this, which of the pixel values of the images is used preferentially in a combined image is determined. In the case of the table in FIG. 15, on a condition that only the flag of the thickening processing is "1", the image after the thickening processing is used and on a condition that only the flag of the UCR processing is "1", the image after the saturation suppression processing is used. In the case where the flags of both pieces of the processing are "1", the image after the thickening processing is used preferentially. In the case where the flags of both pieces of the processing are "0", there is no difference between both the images after the processing and either image may be used, but here, as a matter of convenience, the contents are those in which the image after the thickening processing is used preferentially. The image data for which the combination processing has been performed in this manner is saved in the storage unit 120.

At step 1005, under the control of the main control unit 110, the image data for which the combination processing has been performed is transmitted to the printer via the printer I/F. The above is the contents of the processing in the image processing apparatus according to the present embodiment.

FIG. 16A to FIG. 16D, FIG. 17A to FIG. 17D, and FIG. 18A to FIG. 18D are diagrams explaining effects of the present embodiment and are schematic diagrams one-dimensionally representing an edge portion (corresponding to eight pixels) of a character or a line as in FIG. 1A to FIG. 1D described previously. FIG. 16A to FIG. 16D show a case where the edge portion is an achromatic color and the periphery thereof is a white area, FIG. 17A to FIG. 17D show a case where the edge portion is an achromatic color and the periphery thereof is a chromatic color, and FIG. 18A to FIG. 18D show a case where the edge portion is a chromatic color and the periphery thereof is a white area. In the following, each case is explained.

In FIG. 16A to FIG. 16D, FIG. 16A corresponds to the input image, FIG. 16B corresponds to the image after the thickening processing, FIG. 16C corresponds to the image after the UCR processing, and FIG. 16D corresponds to the image after the combination processing, respectively. At the bottom in FIG. 16B and FIG. 16C, the flags indicating execution/non-execution of pixel value replacement or Black monochromatization are shown. First, to the pixels at Pos. 2 and Pos. 3, the flag value "1" indicating execution of pixel value replacement is added, and therefore, the pixel values (pure black) of these pixels are employed in the combined image in FIG. 16D. Further, to the pixels at Pos. 4 and Pos. 5, the flag value "1" indicating execution of Black monochromatization is added, and therefore, the pixel values (pure black) of these pixels are employed in the combined image in FIG. 16D. As a result of this, the effects of both the thickening processing and the UCR processing are obtained.

In FIG. 17A to FIG. 17D also, FIG. 17A corresponds to the input image, FIG. 17B corresponds to the image after the thickening processing, FIG. 17C corresponds to the image after the UCR processing, and FIG. 17D corresponds to the image after the combination processing, respectively. At the bottom in FIG. 17B and FIG. 17C also, the flags indicating execution/non-execution of pixel value replacement or Black monochromatization are shown. As to Pos. 4 and Pos. 5, a comparison between the flag values in FIG. 17B and the flag values in FIG. 17C indicates that the flag values are "0" indicating non-execution of pixel value replacement in FIG. 17B, but the flag values are "1" indicating execution of Black monochromatization in FIG. 17C. Because of this, as the pixel values at Pos. 4 and Pos. 5 in the combined image in FIG. 17D, the pixel values in the image after the UCR processing are employed based on the table in FIG. 15 described previously. As a result of this, the effect of the thickening processing does not appear in the combined image and only the effect of the UCR processing is obtained.

Figure 18D:
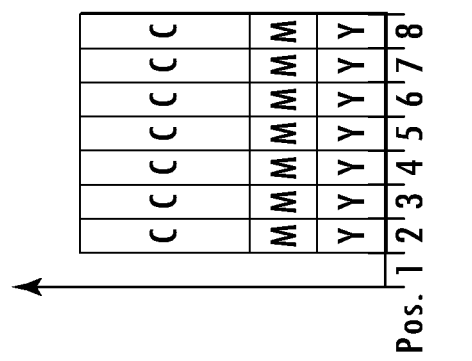
FIG. 18A to FIG. 18D are diagrams explaining effects of the second embodiment.
Figure 18C:
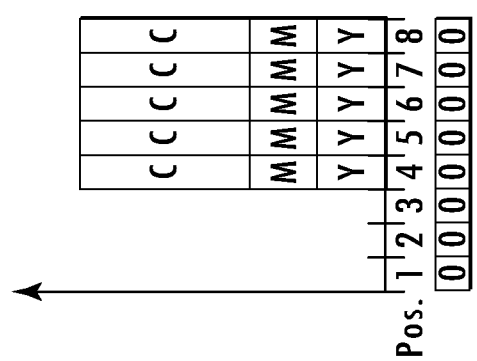
Figure 18B:
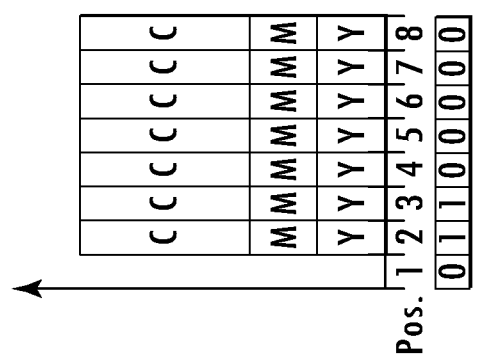
Figure 18A:
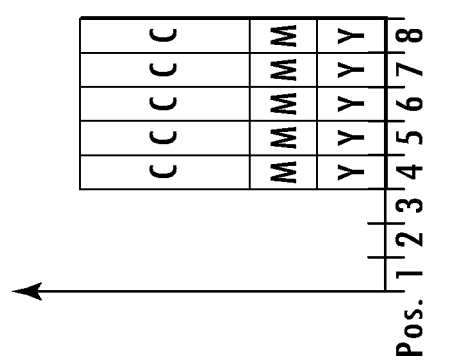

In FIG. 18A to FIG. 18D also, FIG. 18A corresponds to the input image, FIG. 18B corresponds to the image after the thickening processing, FIG. 18C corresponds to the image after the UCR processing, and FIG. 18D corresponds to the image after the combination processing, respectively. Further, at the bottom in FIG. 18B and FIG. 18C also, the flags indicating execution/non-execution of pixel value replacement or Black monochromatization are shown. As to Pos. 2 and Pos. 3, a comparison between the flag values in FIG. 18B and the flag values in FIG. 18C indicates that the flag values are "1" indicating execution of pixel value replacement in FIG. 18B, but the flag values are "0" indicating non-execution of Black monochromatization in FIG. 18C. Because of this, as the pixel values at Pos. 2 and Pos. 3 in the combined image in FIG. 18D, the pixel values in the image after the thickening processing are employed based on the table in FIG. 15 described previously. As a result of this, the effect of the UCR processing does not appear in the combined image and only the effect of the thickening processing is obtained.

As above, in the present embodiment, as to both the thickening processing and the UCR processing, the effects in accordance with the contents of the input image can be obtained. In particular, as to the case where the periphery of the edge portion of a character or a line is the white area, it is possible to appropriately obtain the effects of both pieces of the processing. Further, the configuration of the present embodiment is a configuration in which the thickening processing and the UCR processing are performed in parallel for the same input image, and therefore, it is possible to share the line memory to be used in both pieces of the processing. That is, it is made possible to implement the same effects as those of the first embodiment by a smaller circuit scale.

[Third Embodiment]

In the second embodiment, the aspect is explained in which the configuration is designed so that the thickening processing and the UCR processing are performed in parallel and further, by the flags indicating execution/non-execution of pixel value replacement in the thickening processing and Black monochromatization in the UCR processing, which of the images after the processing is employed at the time of combined image generation is controlled. In the case of the configuration of the second embodiment also, as in the case where the UCR processing is performed first in the first embodiment, there is a possibility that the width of pixels for which Black monochromatization is performed by the UCR processing becomes excessively greater than the supposed width. For example, in the case of the second embodiment, with the intention of performing Black monochromatization for the portion corresponding to two pixels from the edge end portion, the parameter, such as the filter size, in the UCR processing is set (see FIG. 14A to FIG. 14C). However, in the case of FIG. 16A to FIG. 16D described previously, the number of pixels for which Black monochromatization has been performed reaches four, that is, the four pixels at Pos. 2 to Pos. 5 in the combined image. It is not preferable for the edge of a character or a line to be emphasized excessively, exceeding the supposed degree.

Consequently, an aspect is explained as a third embodiment in which the excessively emphasized edge as described above is prevented from occurring based on the second embodiment. In the following, points different from the second embodiment are explained mainly.

Figure 19:
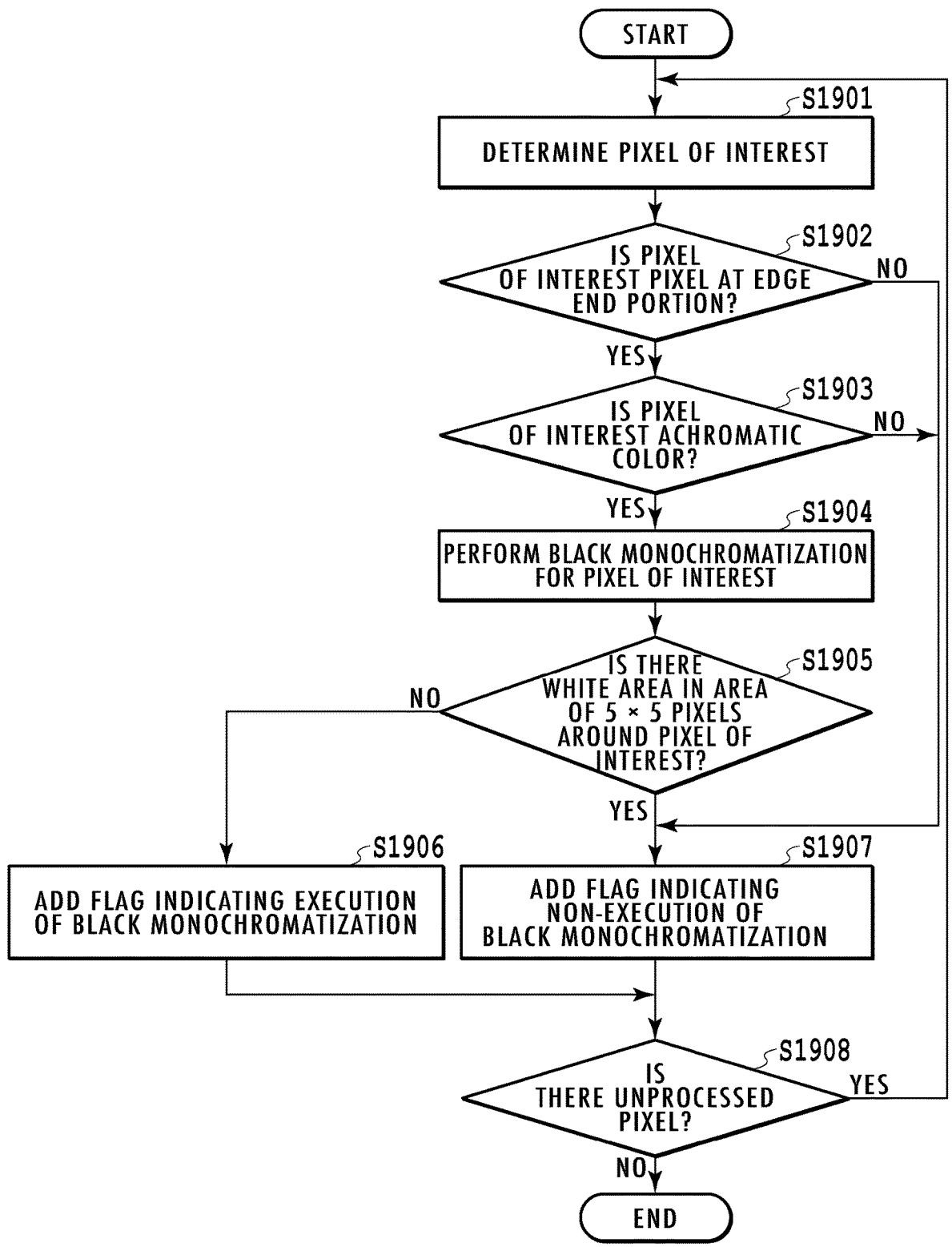
FIG. 19 is a flowchart showing details of UCR processing according to a third embodiment.

The present embodiment differs from the second embodiment in the contents of the UCR processing (step 1003 in FIG. 10) that is performed in parallel to the thickening processing (step 1002 in FIG. 10). FIG. 19 is a flowchart showing details of the UCR processing of the present embodiment. In the following, the UCR processing in the present embodiment is explained in detail with reference to FIG. 19.

Step 1901 to step 1904 are the same as step 1301 to step 1304 of the flow in FIG. 13 of the second embodiment.

First, a pixel of interest within an input image is determined (step 1901) and in the case where the determined pixel of interest is not a pixel at an edge end portion (No at step 1902) or in the case where the determined pixel of interest is located at the edge end portion but is not an achromatic color (No at step 1903), the processing advances to step 1907. On the other hand, in the case where the determined pixel of interest is a pixel at the edge end portion (Yes at step 1902) and is an achromatic color (Yes at step 1903), as to the pixel of interest, Black monochromatization is performed for the pixel value of mixed black (step 1904).

At step 1905, whether there is a white area within a predetermined range (here, within an area of 5×5 pixels) whose center is the pixel of interest for which Black monochromatization has been performed is determined. In the case where the results of the determination indicate that there is not a white area, the processing advances to step 1906. On the other hand, in the case where there is a white area, the processing advances to step 1907.

Figure 20A:
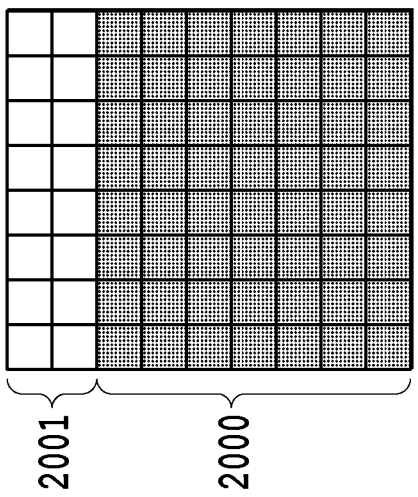
FIG. 20A to FIG. 20F are diagrams showing results of the UCR processing of the third embodiment.
Figure 20B:
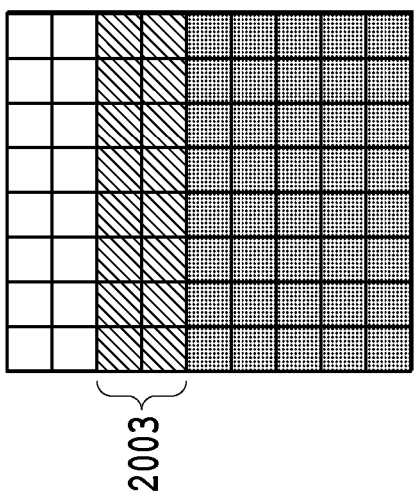
Figure 20C:
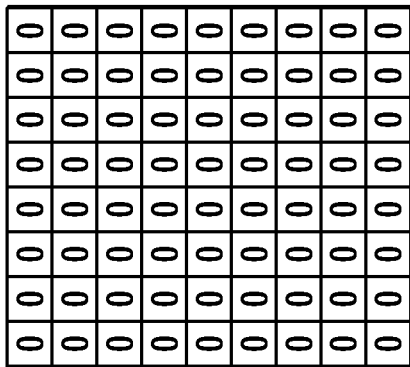
Figure 20D:
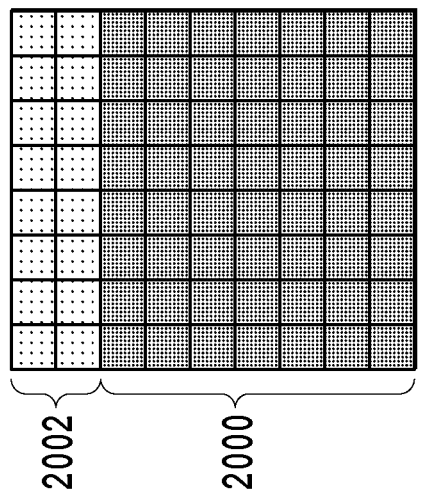
Figure 20E:
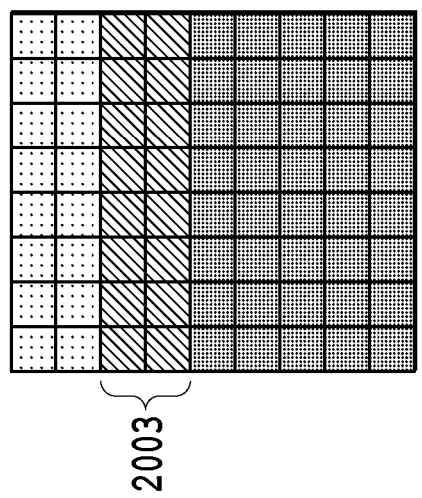
Figure 20F:
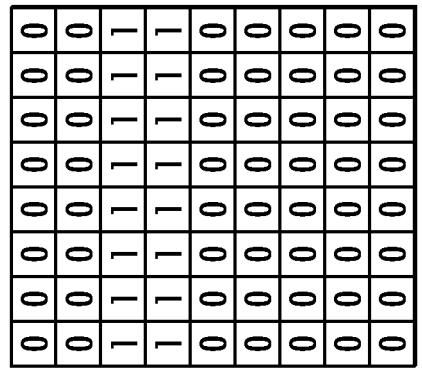

At step 1906, a flag indicating execution of Black monochromatization is generated and added to the pixel of interest. Further, at step 1907, a flag indicating non-execution of Black monochromatization is generated and added to the pixel of interest. That is, in the present embodiment, even in the case where it is determined that the pixel of interest is located at the edge end portion and is an achromatic color and Black monochromatization is performed, on a condition that the periphery thereof is a white area, the flag value "0" indicating non-execution of Black monochromatization is added to the pixel of interest. Only in the case where the periphery of the pixel of interest for which Black monochromatization has been performed is a non-white area, the flag value "1" indicating execution of Black monochromatization is added to the pixel of interest. FIG. 20A to FIG. 20F are diagrams showing the results of the UCR processing of the present embodiment. FIG. 20A and FIG. 20D each show part of the input image before the UCR processing, the portion in the vicinity of an edge in an object, such as a character or a line. The difference between FIG. 20A and FIG. 20D lies in that an area 2001 in contact with a non-white area 2000 having an achromatic color is a white area in FIG. 20A, but an area 2002 in contact with the non-white area 2000 having an achromatic color is a non-white area in FIG. 20D. FIG. 20B shows the results of performing the UCR processing for the partial image shown in FIG. 20A and FIG. 20E shows the results of performing the UCR processing for the partial image shown in FIG. 20D, respectively. Both in FIG. 20B and in FIG. 20E, Black monochromatization is performed for pixels within an area 2003. Then, FIG. 20C shows the contents of the flag added to each pixel of the image after the UCR processing in FIG. 20B and FIG. 20F shows the contents of the flag added to each pixel of the image after the UCR processing in FIG. 20E, respectively. As shown in FIG. 20C, in the case where the area in contact with the edge portion is a white area, the flag value "0" indicating non-execution of Black monochromatization is added also to each pixel of the area 2003, for which Black monochromatization has been performed. On the other hand, in FIG. 20F in the case where the area in contact with the edge portion is a non-white area, the flag value "1" indicating execution of Black monochromatization is added to each pixel of the area 2003.

After the flag is added, at step 1908, whether the processing has been completed for all the pixels within the input image is determined. In the case where there is an unprocessed pixel, the processing returns to step 1901 and the next pixel is determined to be the pixel of interest and the processing is continued. On the other hand, in the case where all the pixels have been processed, the present processing is terminated. The above is the contents of the UCR processing of the present embodiment.

FIG. 21A to FIG. 21D are diagrams explaining the effects of the present embodiment, corresponding to the case in FIG. 16A to FIG. 16D of the second embodiment. As described previously, in the second embodiment, trouble that the effect of the UCR processing becomes excessive occurs in the case in FIG. 16A to FIG. 16D (the case where the edge portion is an achromatic color and the periphery thereof is a white area), but in the present embodiment, this trouble is solved. In FIG. 21A to FIG. 21D, FIG. 21A corresponds to the input image, FIG. 21B corresponds to the image after the thickening processing, FIG. 21C corresponds to the image after the UCR processing, and FIG. 21D corresponds to the image after the combination processing, respectively. At the bottom in FIG. 21B and FIG. 21C, the flags indicating execution/non-execution of pixel value replacement or Black monochromatization are shown. First, to Pos. 2 and Pos. 3, the flag value "1" indicating execution of pixel value replacement is added, and therefore, the pixel values in the image after the thickening processing are employed in the combined image based on the table in FIG. 15 described previously. Then, to Pos. 4 and Pos. 5, the flag value "0" indication non-execution of both pixel value replacement and Black monochromatization K is added, and therefore, the pixel values in the image after the thickening processing are employed in the combined image based on the table in FIG. 15 described previously. That is, in the combined image, only the pixel values in the image after the thickening processing are employed. As a result of this, Black monochromatization is performed only for the two pixels at Pos. 2 and Pos. 3, for which the thickening processing has been performed, and it is possible to obtain the effect of the UCR processing with a supposed pixel width. Because of this, it is possible to obtain the appropriate effects for both the thickening processing and the UCR processing.

As above, according to the present embodiment, in the configuration in which the thickening processing and the UCR processing are performed in parallel, it is possible to prevent the UCR processing from acting excessively although the circuit has a small scale equal to that of the second embodiment.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case where both the thickening processing and the UCR processing are performed for an object, it is made possible to obtain the appropriate effects for both pieces of the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-236670, filed Dec. 6, 2016, which is hereby incorporated by reference wherein in its entirety.

What is claimed is:

1. An image processing method comprising:
performing a first thickening process for an image object of which an edge portion includes a pixel of a chromatic color represented by a mixture of a plurality of chromatic color components, by converting a white pixel which is adjacent to the pixel included in the edge portion into a pixel having a plurality of color components;
performing a second thickening process for an image object of which an edge portion includes a pixel of an achromatic color represented by a mixture of a plurality of chromatic color components, by converting a white pixel which is adjacent to the pixel included in the edge portion into a pixel having only a monochromatic color component; and
printing an image including the converted pixel.

2. The image processing method according to claim 1, wherein
whether the edge portion is an achromatic color or a chromatic color is determined based on color values of the plurality of chromatic color components of the pixel included in the edge portion.

3. The image processing method according to claim 1, wherein color components of the pixels of at least a part of the image object are not changed.

4. The image processing method according to claim 1, further comprising converting a pixel of the edge portion into a pixel having only a monochromatic color component in a case where a mixture of the plurality of chromatic color components of the pixel of the edge portion is an achromatic color.

5. The image processing method according to claim 4, wherein a conversion of a pixel value of the white pixel adjacent to the edge portion is executed by a first circuit and a conversion of a pixel value of the pixel of the edge portion is performed by second circuit different from the first circuit.

6. The image processing method according to claim 1, wherein the plurality of color components are cyan magenta and yellow, and the monochromatic color component is black.

7. The image processing method according to claim 5, wherein the conversion by the first circuit and the conversion by the second circuit are executed in parallel.

8. An image processing apparatus comprising:
at least one controller, having at least one processor which executes instructions stored in at least one memory, and/or at least one circuitry,
wherein the controller is configured to:
perform a first thickening process for an image object of which an edge portion includes a pixel of a chromatic color represented by a mixture of a plurality of chromatic color components, by converting a white pixel which is adjacent to the pixel included in the edge portion into a pixel having a plurality of color components;
perform a second thickening process for an image object of which an edge portion includes a pixel of an achromatic color represented by a mixture of a plurality of chromatic color components, by converting a white pixel which is adjacent to the pixel included in the edge portion into a pixel having only a monochromatic color component; and
print an image including the converted pixel.

9. The image processing apparatus according to claim 8, further comprising another processor or circuitry for converting a pixel of the edge portion into a pixel having only a monochromatic color component in a case where a mixture of the plurality of chromatic color components of the pixel included in the edge portion is an achromatic color.

10. The image processing apparatus according to claim 9, wherein the processor or circuitry and the other processor or circuitry are disposed in parallel.

11. The image processing apparatus according to claim 8, wherein the plurality of color components are cyan, magenta and yellow, and the monochromatic color component is black.

* * * * *